(12) United States Patent
Sudo

(10) Patent No.: US 7,147,475 B2
(45) Date of Patent: Dec. 12, 2006

(54) PERSONAL COMPUTER LESSON SYSTEM USING VIDEOPHONES

(75) Inventor: Satoru Sudo, Shibuya-ku (JP)

(73) Assignee: Nova Corporation, Osaka (JP)

( * ) Notice: Subject to any disclaimer, the term of this patent is extended or adjusted under 35 U.S.C. 154(b) by 182 days.

(21) Appl. No.: 10/482,026

(22) PCT Filed: Jun. 26, 2002

(86) PCT No.: PCT/JP02/06449

§ 371 (c)(1),
(2), (4) Date: Jun. 21, 2004

(87) PCT Pub. No.: WO03/003328

PCT Pub. Date: Jan. 9, 2003

(65) Prior Publication Data

US 2004/0241624 A1 Dec. 2, 2004

(30) Foreign Application Priority Data

Jun. 27, 2001 (JP) .............................. 2001-194399

(51) Int. Cl.
*G09B 3/00* (2006.01)

(52) U.S. Cl. ................. 434/322; 434/307 R; 434/350; 434/362; 348/729; 379/93.19

(58) Field of Classification Search ................ 434/118, 434/307 R, 308, 322, 323, 350, 362, 365, 434/219; 379/93.19; 348/322; 706/62
See application file for complete search history.

(56) References Cited

U.S. PATENT DOCUMENTS

| | | | | |
|---|---|---|---|---|
| 4,785,472 | A * | 11/1988 | Shapiro | 379/93.19 |
| 5,602,580 | A * | 2/1997 | Tseng | 348/729 |
| 5,823,786 | A | 10/1998 | Easterbrook | |
| 6,024,577 | A * | 2/2000 | Wadahama et al. | 434/322 |
| 6,411,796 | B1 * | 6/2002 | Remschel | 434/350 |
| 6,705,869 | B1 * | 3/2004 | Schwartz | 434/219 |
| 6,937,841 | B1 * | 8/2005 | Guy et al. | 434/350 |
| 2002/0091658 | A1 * | 7/2002 | Bae | 706/62 |
| 2002/0182578 | A1 * | 12/2002 | Rachman et al. | 434/350 |
| 2003/0027111 | A1 * | 2/2003 | Lee et al. | 434/157 |
| 2005/0158697 | A1 * | 7/2005 | Nelson et al. | 434/350 |

FOREIGN PATENT DOCUMENTS

| | | |
|---|---|---|
| JP | 9-62173 | 3/1997 |
| JP | 9-506978 | 7/1997 |
| JP | 10-20757 | 1/1998 |
| JP | 11-220707 | 8/1999 |
| JP | 11-338339 | 12/1999 |

(Continued)

OTHER PUBLICATIONS

"World Wide Learn" Newslette, Sep. 1999, 6 pages.*

*Primary Examiner*—Joe H. Cheng
(74) *Attorney, Agent, or Firm*—Wenderoth, Lind & Ponack, L.L.P.

(57) ABSTRACT

In this system, an instructor's device for teaching how to operate a personal computer is bidirectionally connected to a student's device for learning how to operate a personal computer, via a communication line of various types. The instructor's device has a personal computer as a lesson device, together with a TV monitor, a terminal, etc. for a videophone. The student's device 3 has a PC 1 as a lesson device, together with a TV monitor, a terminal 34, etc. for a videophone. The instructor and the student have a lesson on the personal computers, together with watching the TV monitors respectively.

12 Claims, 7 Drawing Sheets

FOREIGN PATENT DOCUMENTS

| | | |
|---|---|---|
| JP | 11338339 A * | 12/1999 |
| JP | 2000-250392 | 9/2000 |
| JP | 2000-321970 | 11/2000 |

* cited by examiner

PERSONAL COMPUTER LESSON SYSTEM USING VIDEOPHONES

TECHNICAL FIELD

This invention relates to a personal computer (PC) lesson system using videophones.

BACKGROUND ART

As a method for teaching how to operate a personal computer, online personal computer lesson systems using videophones have been proposed. In such conventional systems, an instructor's personal computer and a student's personal computer are connected via a standard telephone line, and share each other's screen image on their PC screens.

Nevertheless, this system has some drawbacks. One drawback is that, if a personal computer (PC) goes down (i.e., operation failure) during the operation or the like, a telephone line is disconnected. Once this happens, it is impossible to communicate with the instructor and to continue the PC lesson. Another drawback is that, when a PC goes down, the only option is to reboot the PC, reconnect with the instructor's PC, and resume a lesson all over again. In this case, tasks achieved and the time spent in the previous lesson are wasted.

This invention is made to solve these problems. An object of this invention is therefore to provide a personal computer lesson system using videophones, wherein the connection of personal computers is separated from the communication facility of videophones. In this system, even if a personal computer goes down during a lesson, the videophone facility allows the lesson to go on.

SUMMARY OF THE INVENTION

According to this invention, a personal computer lesson system using videophones comprises an instructor's device for teaching how to operate a personal computer, and a student's device for learning how to operate a personal computer, where both devices being bidirectionally connected to each other via a communication line of various types. The instructor's device comprises: a personal computer as a lesson device; an image taking means for taking an instructor's image and an image of a keyboard; a voice input means for inputting instructor's voice; a mixer switcher means for mixing or switching between image information loaded from the personal computer and image information taken by the image taking means, where either the mixing or the switching is conducted as required; a transmitting means for multiplexing image information and voice information and for transmitting multiplexed information to the student's device, wherein the image information is the one which is mixed or switched as required, by the mixer switcher means, and the voice information is the one which is input from the voice input means; a display means for displaying image information sent from the student's device; and a voice output means for outputting voice information sent from the student's device. The student's device comprises: a personal computer as a lesson device; an image taking means for taking a student's image and an image of a keyboard; a voice input means for inputting student's a voice; a transmitting means for multiplexing image information and voice information and for transmitting multiplexed information to the instructor's device, wherein the image information is either the one loaded from the personal computer or the one taken by the image taking means, and the voice information is the one which is input by the voice input means; a display means for displaying image information sent from the instructor's device; and a voice output means for outputting voice information sent from the instructor's device. The image information or the voice information is loaded into an instructor's terminal which controls the instructor's device and into a student's terminal which controls the student's device, and is transmitted from the respective terminals to the other terminals, via the transmission means. Further, the image information loaded from the personal computer includes not only screen information, but also teaching material data stored in the personal computer, teaching material data read out from an external storage medium, and the like. Moreover, in a personal computer lesson system using videophones according to the present invention, even if the student's personal computer or the instructor's personal computer goes down, the lesson can be continued via the transmission means.

Owing to these features of the invention, the student can learn how to operate his/her own personal computer, by watching an image of the instructor's personal computer or the instructor's keyboard image which is shown on the display means of the student's device, and by following the instructor's voice which is output from the voice output means. Further, the image information loaded from the personal computer includes not only screen information, but also teaching material data stored in the personal computer, teaching material data read out from an external storage medium, and the like. Hence, by watching these teaching materials, the student can acquire more specific manners instruction for operating a personal computer.

In the case where, for example, the student's personal computer goes down during a lesson, the student's videophone facilities, such as the image taking means, the voice input means and the display means, keep on working actively. The videophone facilities enable the student to communicate with the instructor by way of images and voice, so that the lesson can go on without interruption from a process of rebooting the failed personal computer. In other words, since the communication line with the instructor's device remains connected after the student's personal computer goes down, even a beginner can continue the lesson under the instructor's directions and will not panic. Similarly, if the instructor's personal computer goes down, the instructor's videophone facilities, such as the image taking means, the voice input means and the display means, keep on working actively. The videophone facilities enable the instructor to communicate with the student by way of images and voice, so that the lesson can go on without interruption. It should be noted that the voice information sent from the instructor's device to the student's device and vice versa includes sound (audio) information such as a sound.

Furthermore, in a personal computer lesson system using videophones according to this invention, the instructor's device is equipped with an electronic blackboard which allows various notes to be written on the image loaded from the personal computer. Personal computer image information written and processed on this electronic blackboard is output to the mixer switcher means.

Owing to this feature of the invention, various notes can be written on the image loaded from the personal computer. For example, it is possible to indicate an icon's position on the initial screen of the personal computer by encircling the icon. It is also possible to give accurate directions by writing "Double click here." or the like, so as to prevent input errors by the student.

Still further, in a personal computer lesson system using videophones according to this invention, the instructor's device and one or more student's devices are bidirectionally connected to each other via a multipoint control device. This multipoint control device establishes mutual connection between the one or more student's devices and the instructor's device which are connected to the multipoint control unit.

With this feature of the invention, one instructor can simultaneously give a lesson to more than one student, thus realizing a one-to-many lesson on the personal computer.

Yet further, in a personal computer lesson system using videophones according to this invention, the multipoint control unit synthesizes, as split views on one screen, image information sent from the instructor's device and the student's devices which are connected to the multipoint control unit. The thus synthesized image is displayed on screens of the instructor's device and the student's devices, so that the image information from all devices which are connected to the multipoint control unit is simultaneously displayed as split views on one screen.

With this feature of the invention, a lesson on the personal computer can be held in a group of one instructor and more than one student, as if they were in the same classroom.

DETAILED DESCRIPTION OF THE INVENTION

An embodiment of this invention is hereinafter described with reference to the drawings.

Figure 1:
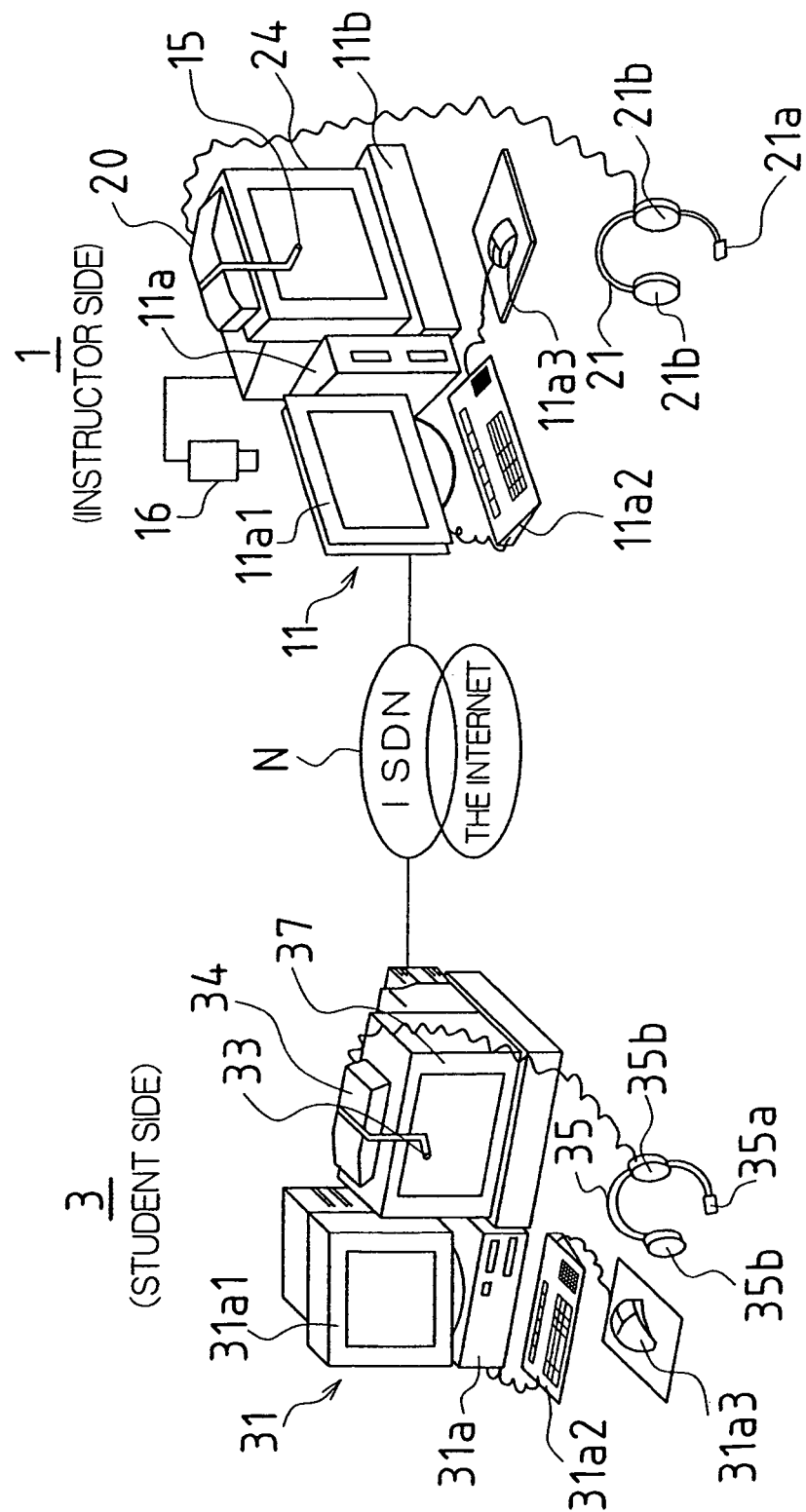
FIG. 1 is a conceptual view showing an overall configuration of a personal computer lesson system using videophones according to this invention.

FIG. 1 is a conceptual view showing an overall configuration of a personal computer lesson system using videophones according to this invention.

In the personal computer (PC) lesson system using videophones according to the invention, an instructor's device 1 for teaching how to operate a PC is bidirectionally connected to a student's device 3 for learning how to operate a PC, via a communication line N of various types such as an integrated services digital network (ISDN) or the Internet.

Externally, the instructor's device 1 is composed of a personal computer (PC) 11 as a lesson device (which includes PC units 11a, 11b, a monitor 11a1, a keyboard 11a2, and a mouse 11a3), a monitor 24 which displays various videos sent from the student's device 3, a camera 15 which takes an image of an instructor's face and the like, an overhead camera (OHC) 16 which takes an image of the keyboard 11a2, the mouse 11a3 and the like operated by the instructor, a headset 21 having a microphone 21a and earpieces 21b, and a terminal (a videophone) 20 which is connected to a terminal adapter (not shown) and which holds overall control of the instructor's device 1.

Externally, the student's device 3 is composed of a personal computer (PC) 31 as a lesson device (which includes a PC unit 31a, a monitor 31a1, a keyboard 31a2, and a mouse 31a3), a monitor 37 which displays various images sent from the instructor's device 1, a camera 33 which takes a student's image and the like, a headset 35 having a microphone 35a and earpieces 35b, and a terminal 34 which is connected to a terminal adapter (not shown) and which holds overall control of the student's device.

To sum up the system configuration of the personal computer lesson system using videophones according to this invention, the instructor's device 1 has the PC 11 as a lesson device (the PC unit 11a, the monitor 11a1, the keyboard 11a2, and the mouse 11a3), together with the monitor 24, the terminal 20, etc. for the videophone. The student's device 3 has the PC 31 as a lesson device (the PC unit 31a, the monitor 31a1, the keyboard 31a2, and the mouse 31a3), together with the monitor 37, the terminal 34, etc. for the videophone.

Figure 2:
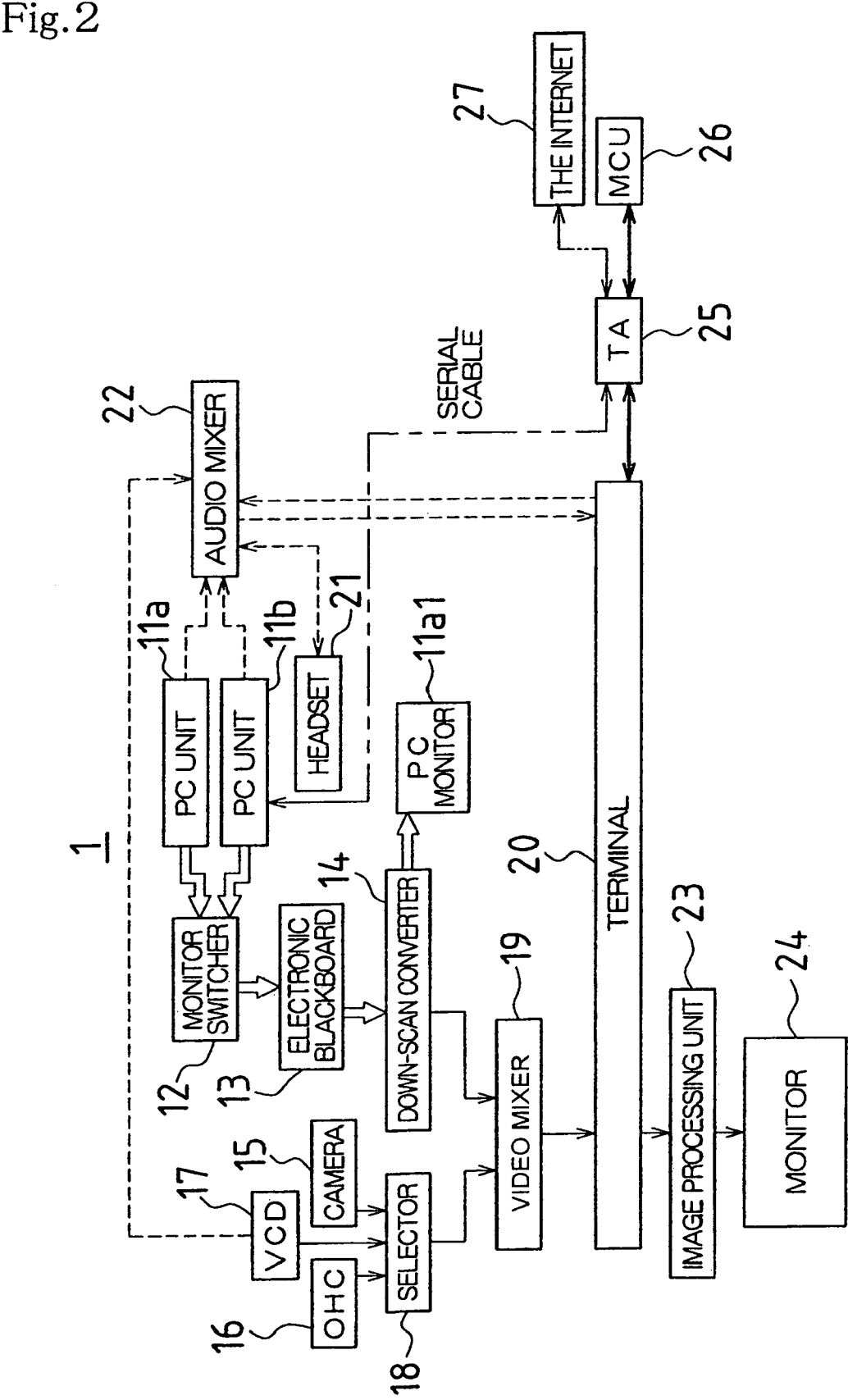
FIG. 2 is a schematic block diagram of an instructor's device, concerning the personal computer lesson system using videophones shown in FIG. 1.

FIG. 2 is a schematic block diagram of the instructor's device 1, concerning the personal computer lesson system using videophones shown in FIG. 1.

The instructor's device 1 is composed of: a plurality of PCs 11a, 11b as a lesson device (two PCs in this embodiment); a monitor switcher 12 which switches images from the PCs 11a, 11b and outputs one of them; an electronic blackboard 13 which allows various notes to be written on the PC image to which the monitor switcher 12 is switched; a down-scan converter 14 by which RGB-based PC image information written and processed on this electronic blackboard 13 is converted into NTSC TV signals; the camera 15 which takes an image of an instructor's face and the like; the OHC 16 which takes an image of the keyboard and the like operated by the instructor; a video CD (VCD) 17 which stores audio/visual data on a variety of PC teaching materials; a selector 18 which selects any of the camera 15, the OHC 16 and the VCD 17 for image (video) output; a video mixer 19 which mixes the PC image information which is output from the down-scan converter 14 as NTSC TV signals, and image information selected by the selector 18; the terminal 20 which transmits signals from the video mixer 19 to a multipoint control unit (MCU) 26 via a terminal adapter (TA) 25; an image processing unit 23 which processes image information sent from the student's device 3; and a monitor 24 which displays an image processed by the image processing unit 23. The terminal adapter (TA) 25 connects the PCs 11a, 11b and the Internet 27. In other words, the terminal adapter (TA) 25 controls two connection paths, one connecting the terminal (the videophone) 20 and the multipoint control unit (MCU) 26, and the other connecting the PCs 11a, 11b and the Internet 27.

Further, an audio mixer 22 is equipped in order to mix audio information from the PCs 11a, 11b, audio information from the VCD 17, and instructor's voice information which is input from the microphone 21a of the headset 21 (see FIG.

1), and to output the resulting information from the terminal 20 to the student's device 3. Besides, the audio mixer 22 receives student's voice information from the student's device 3 via the terminal 20, and outputs this information to the earpieces 21b of the headset 21 (see FIG. 1). The monitor 24 displays image information sent from the student's device 3. Additionally, output from the down-scan converter 14 (RGB output) is also sent to the monitor 11a1 of a PC in service (e.g. 11a). Thus, a PC image written and processed on the electronic blackboard 13 can be checked on the monitor 11a1 of the PC 11a.

Incidentally, FIG. 2 omits an illustration of the keyboard and the mouse which are connected to the PC units 11a, 11b. Further referring to FIG. 2, the single selector 18 selects any one of the camera 15, the OHC 16 and the VCD 17, for input to the video mixer 19. Alternatively, each of the camera 15, the OHC 16 and the VCD 17 may be equipped with a selector and may make input to the video mixer 19. As a result, it is possible to generate synthetic images in various combinations (e.g. a combination of an image from the camera 15, an image from the OHC 16, and an image from the down-scan converter 14).

In FIG. 2, thin solid lines represent NTSC signal lines, outline arrows are RGB signal lines, broken lines mean audio signal lines, a two-dot chain line denotes a serial cable for connecting the PC units 11a, 11b and the TA 25, and thick solid lines indicate ISDN lines.

Figure 3:
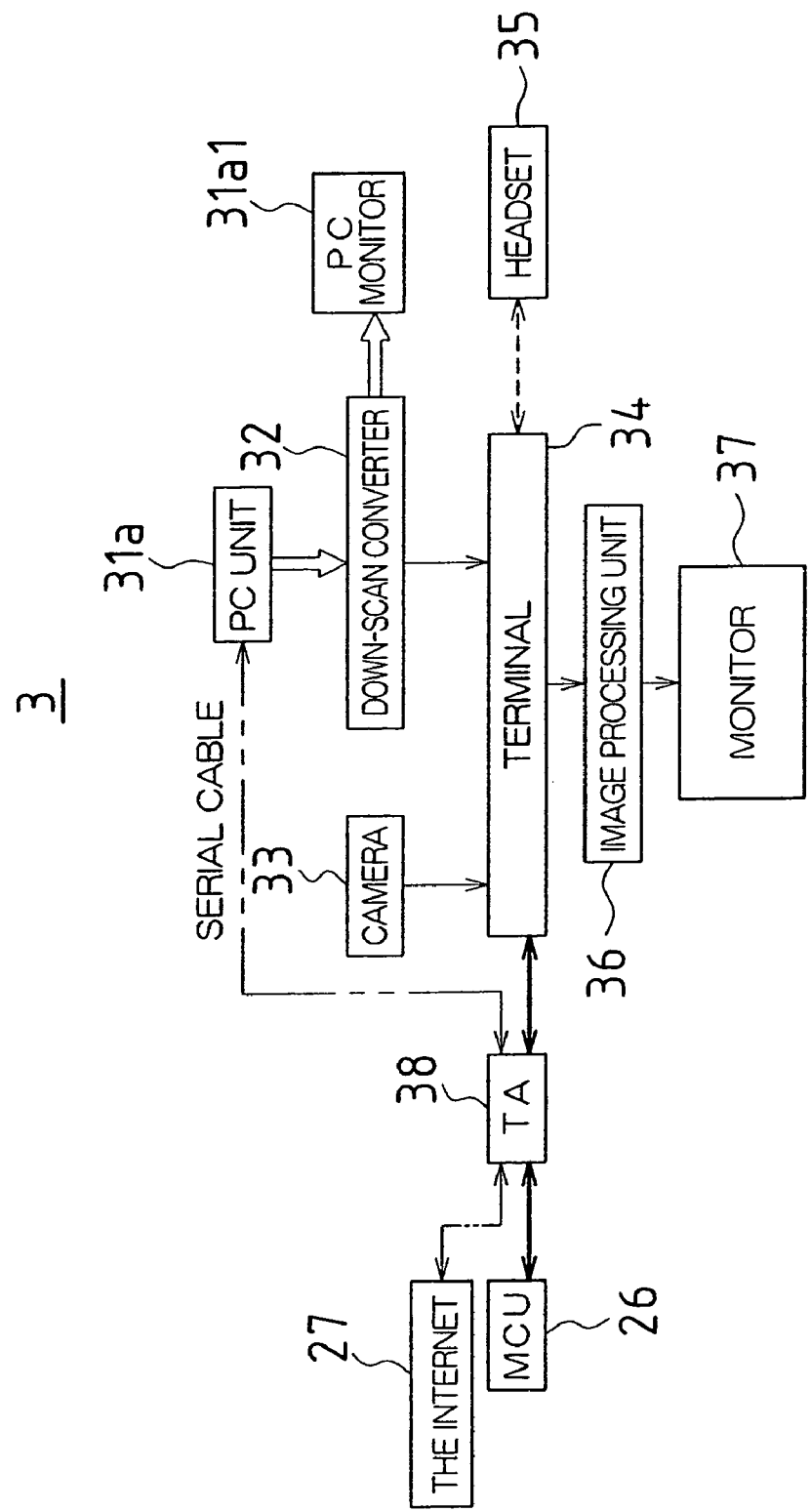
FIG. 3 is a schematic block diagram of a student's device, concerning the personal computer lesson system using videophones shown in FIG. 1.

FIG. 3 is a schematic block diagram of the student's device 3, concerning the personal computer lesson system using videophones shown in FIG. 1.

The student's device 3 is composed of: the PC unit 31a of the PC 31 as a lesson device; a down-scan converter 32 by which RGB-based PC image information from the PC unit 31a is converted into NTSC TV signals; the camera 33 which takes a student's image and the like; the terminal 34 which receives the PC image information from the down-scan converter 32 and the image information of the student's image taken by the camera 33, and which outputs either image information to the multipoint control unit (MCU) 26 via a terminal adapter (TA) 38; an image processing unit 36 which processes image information sent from the instructor's device 1; and a monitor 37 which displays an image processed by the image processing unit 36. The terminal adapter (TA) 38 connects the PC unit 31a and the Internet 27. In other words, the terminal adapter (TA) 38 controls two connection paths, one connecting the terminal (the videophone) 34 and the multipoint control unit (MCU) 26, and the other connecting the PC unit 31a and the Internet 27.

The terminal 34 is bidirectionally connected to the headset 35, and is also connected to the monitor 37 for displaying image information sent from the instructor's device 1. Output from the down-scan converter 32 is also sent to the monitor 31a1 of the PC 31 in service.

Incidentally, FIG. 3 omits an illustration of the keyboard 11a2 and the mouse 11a3 which are connected to the PC unit 31a.

In FIG. 3, thin solid lines represent NTSC signal lines, outline arrows are RGB signal lines, a broken line means an audio signal line, a two-dot chain line denotes a serial cable for connecting the PC unit 31a and the TA 38, and thick solid lines indicate ISDN lines.

In the above configuration, the instructor's device 1 contains a plurality of personal computers (the PC units 11a, 11b). This allows the instructor to choose a PC as a lesson device, depending on the operating environment of the PC owned by the student (the PC unit 31a). By way of example, suppose that the instructor's device 1 is equipped with a PC which runs on the Windows® 98 operating system (OS) (e.g. the PC unit 11a) and a PC which runs on the Windows NT® operating system (OS) (e.g. the PC unit 11b). If the student's PC runs on Windows® 98, for example, the instructor operates the monitor switcher 12 to the PC unit 11a and starts a lesson. This switching process is done by the instructor by using a remote controller (not shown). Instead of switching the personal computers depending on the student's operating environment, the two PC units 11a, 11b may be set to work on the same operating environment. In this working environment, even if one of the PC units (e.g. the PC unit 11a) goes down, the instructor can switch to the other PC unit 11b immediately and continue the lesson.

According to this configuration, while the instructor and the student communicate vocally via their headsets 21, 35, the instructor can conduct a PC lesson by watching the monitor 24 which displays a student's PC image and checking the student's operation in real time. On the other hand, the student can learn how to operate a PC by imitating the instructor's keyboard operation, by watching the monitor 37 which displays an instructor's PC image and an image overlapped thereon (e.g. a keyboard image taken to show the instructor's input operations). Further, the PC image on the student's monitor 37 includes, for example, information written on the electronic blackboard 13 as required by the instructor. Hence, the student can operate his/her PC by following the contents indicated thereon, so that input errors by the student can be reduced to a minimum level.

The image information to be sent from the instructor's device 1 to the student's device 3 includes not only the PC images and the PC screens as above, but also teaching material data stored in the PC 11 (11a, 11b) as a lesson device, teaching material data read out from an external storage medium such as a CD-ROM or an MO, playback images of MPEG video files, playback images of slide files, Internet connection screens, and other various images. The student's monitor 37 shows them as animated images or still images.

The following description is directed to a specific lesson example conducted under the personal computer lesson system using videophones according to this invention.

Figure 4:
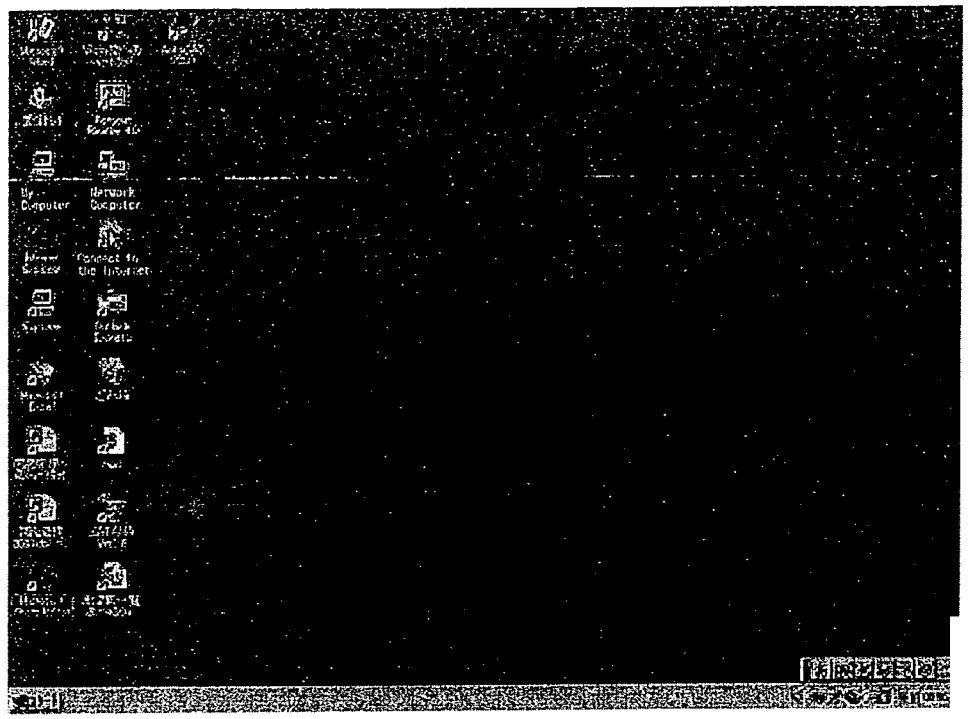
FIG. 4 is a descriptive illustration of a screen example which is sent from the student side and displayed on an instructor's monitor.

FIG. 4 is a screen example which is sent from the student side and displayed on the instructor's monitor 24, indicating that the monitor 31a1 of the student's PC 31 presents an initial screen.

Figure 5:
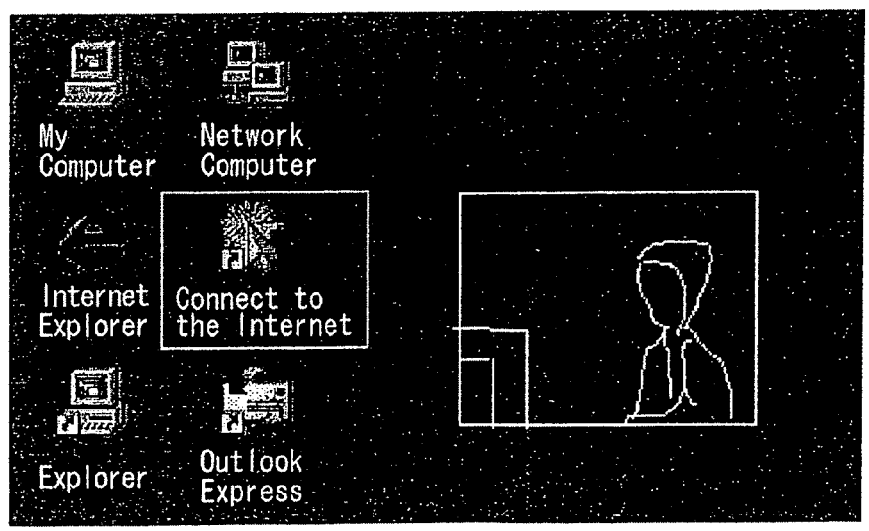
FIG. 5 is a descriptive illustration of a screen example which is sent from the instructor side and displayed on a student's monitor.

FIG. 5 is a screen example which is sent from the instructor side and displayed on the student's monitor 37 in order to teach how to connect to the Internet. The screen example of FIG. 5 is created in the instructor's device 1 in the following manner.

The instructor switches the monitor switcher 12, for example, to the PC unit 11a as a lesson device (this is done by using a remote controller or the like, not shown), and lets the initial screen on the PC unit 11a (the same screen as the student's initial screen) be output to the electronic blackboard 13. On this electronic blackboard 13, the instructor encircles an icon named as "Connect to the Internet" and writes "double click" beside this icon. Then, this image information is converted by the down-scan converter 14 into NTSC video signals, which are input into the video mixer 19. In addition, the instructor controls the selector 18 (this is done by using a remote controller or the like, not shown) such that an instructor's own image taken by the camera 15 can be input into the video mixer 19. Eventually, the video mixer 19 synthesizes the video information containing the notes written on the electronic blackboard 13 and the instructor's image taken by the camera 15. The resulting image information, as represented in FIG. 5, is sent from the terminal 20, via the TA 25 and the MCU 26, to the student's device 3. Consequently, with the encircled icon being shown on the monitor 37, the student can find the same icon on the monitor 31a1 of his/her PC 31, can move the cursor and double-click on the icon by the mouse 31a3 or the like, and can finally get connected to the Internet.

Figure 6:
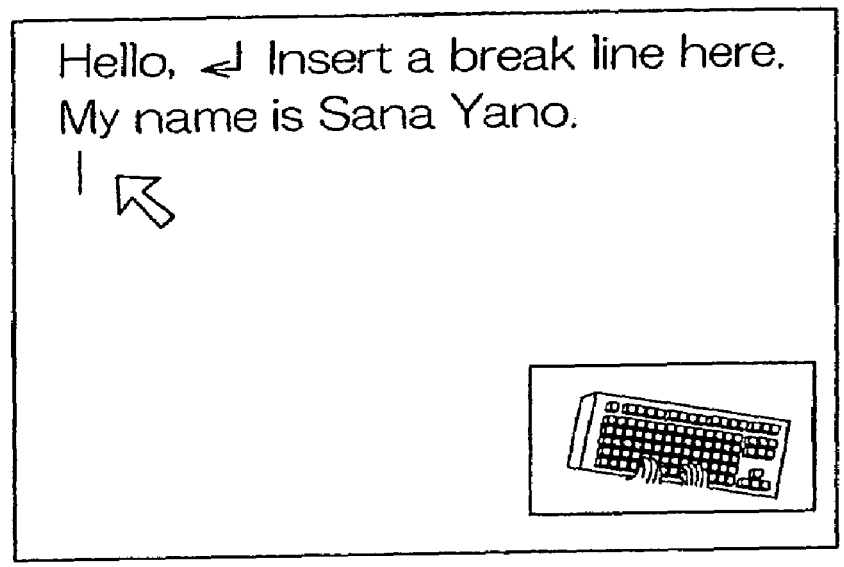
FIG. 6 is a descriptive illustration of a screen example which is sent from the instructor side and displayed on a student's monitor.

FIG. 6 is a screen example which is sent from the instructor side and displayed on the student's monitor 37 in order to teach how to create a document by word processing software such as Word®. The screen example of FIG. 6 is created in the instructor's device 1 in the following manner.

The instructor switches the monitor switcher 12, for example, to the PC unit 11a as a lesson device (this is done by using a remote controller or the like, not shown), starts word processing software in the PC unit 11a and opens a text input screen. On this text input screen, the instructor types text according to teaching materials for word processing which are provided from the VCD 17 or the like. Next, the instructor outputs this typed text to the electronic blackboard 13. Thereafter, on this electronic blackboard 13, the instructor writes "Insert a line break here." beside the typed text. Then, this image information is converted by the down-scan converter 14 into NTSC video signals, which are input into the video mixer 19. In addition, the instructor controls the selector 18 (this is done by using a remote controller or the like, not shown) such that an image of the instructor's keyboard operation, which is an image taken by the OHC 16, can be input into the video mixer 19. Eventually, the video mixer 19 synthesizes the video information (a text input screen) containing the notes written on the electronic blackboard 13 and the image of instructor's keyboard operation taken by the OHC 16. The resulting image information, as represented in FIG. 6, is sent from the terminal 20, via the TA 25 and the MCU 26, to the student's device 3. Consequently, by watching the image of instructor's keyboard operation shown on the monitor 37, the student types on the keyboard 31a2 of his/her PC 31 to enter the same text as displayed on the monitor 37.

During this on-screen lesson between the instructor's device 1 and the student's device 3, the instructor and the student can conduct vocal communication (a lesson) via their respective headsets 21, 35.

The most distinct feature of the personal computer lesson system using videophones, as configured above, resides in that image information from the PCs 11, 31 is not exchanged directly via ISDN lines. To put it differently, image information from the PCs 11, 31 is loaded into the terminals 20, 34 via the down-scan converters 14, 32, and is then sent to the other terminals by the videophone facility of the terminals 20, 34.

This feature brings the following advantages. For example, even if the student's PC 31 goes down and hampers transmission of image information from the PC 31 to the instructor's device 1, videophone communication remains active. Thus, via videophone, the instructor's device 1 and the student's device 3 can communicate vocally or can exchange videos taken by the cameras. As a result, the personal computer lesson system according to this invention can be utilized to teach how to recover the failed PC 31. Similarly, if the teacher's PC 11 goes down, videophone communication remains active. Hence, the instructor can continue the lesson via videophone by communicating vocally or sending an image taken by the camera 15 to the student's device 3.

As shown in FIG. 1, the above embodiment uses the single selector 18 to select any of the camera 15, the OHC 16 and the VCD 17 for image (video) output. Nevertheless, the embodiment is not limited to one selector 18 and may include more than one selector 18. When the number of selectors 18 is increased, a plurality of cameras 15, OHCs 16 and VCDs 17 may be provided as necessary. Consequently, the selectors are used to divide signals from these devices and switch over each other, so that the signals can be output to the video mixer 19 in various combinations. It is also possible to provide one or more selectors between the down-scan converter 14 and the video mixer 19, which further diversifies signal combinations to be output to the video mixer 19.

In order to simplify the description, the above embodiment is configured with one instructor's device 1 and one student's device 3 which are connected by the MCU 26. However, the function of the MCU 26 permits a one-to-many (one-to-three, for example) PC lesson, by establishing mutual connection between one instructor's device 1 and a plurality of (e.g. three) student's devices 3, 3, 3. In this case, the MCU 26 synthesizes, as split views on one screen, image information sent from the instructor's device 1 and the student's devices 3, 3, 3 which are connected to the MCU 26. The thus synthesized image is displayed on the monitor screens of the instructor's device 1 and the student's devices 3, 3, 3. In this manner, the image information from all devices which are connected to the MCU 26 is simultaneously displayed as split views on one screen.

As the MCU 26 for generating such a synthetic image, a central device disclosed in Japanese Patent Laid-open Publication No. H11-220707 is mentioned as one possibility.

Figure 7:
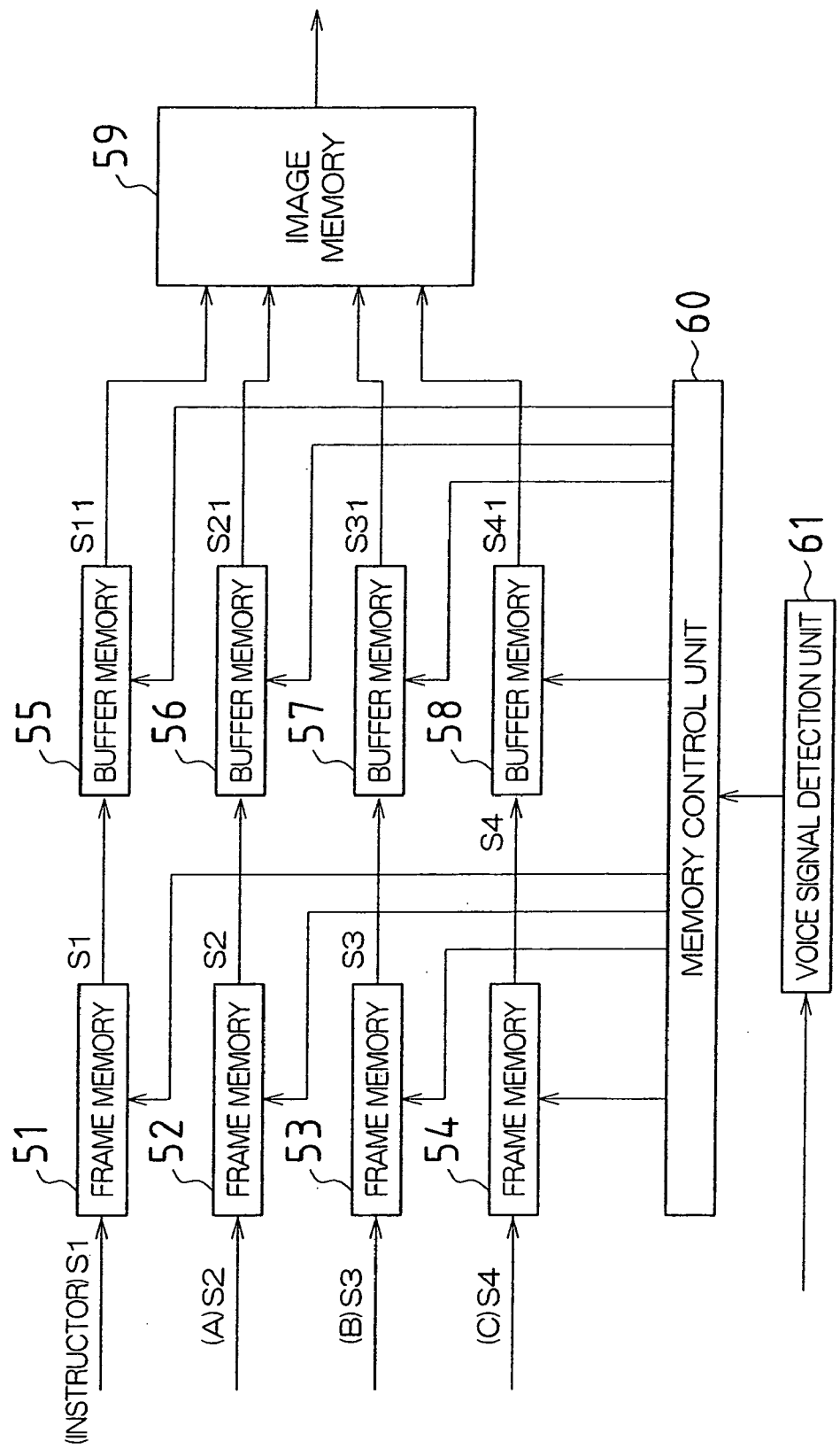
FIG. 7 is a functional block diagram showing a configuration example of a multipoint control unit for generating a synthetic image.

Specifically, as shown in FIG. 7, the central device comprises: frame memories 51, 52, 53, 54 which respectively write one screen worth (i.e. on a frame-by-frame basis) of image information (video signals) from the instructor's device 1 and of image information (video signals) from the student's devices 3, 3, 3; buffer memories 55, 56, 57, 58 which write video signals read out from these frame memories 51, 52, 53, 54, respectively, on a per-horizontal scanline basis; an image memory 59 which reads out, as required, the per-horizontal scanline-based video signals written on the buffer memories 55, 56, 57, 58, and which then generates and stores one screen worth of image data (synthetic video signals); a memory control unit 60 which controls the frame memories 51, 52, 53, 54, the buffer memories 55, 56, 57, 58 and the image memory 59; and a voice signal detection unit 61 which detects voice signals from the instructor's device 1 and those from the student's devices 3, 3, 3.

A process for generating synthetic image signals for a screen which is split into four equal sections is described below.

Instructor's video signals S1 and student's (A, B, C) video signals S2, S3, s4 sent from the student's devices 3, 3 . . . are written respectively on the frame memories 51, 52, 53, 54, on a frame-by-frame basis. When one frame worth of video signals is written, the video signals are output to the buffer memories 55, 56, 57, 58 in the next stage. The read-out video signals S1, S2, S3, S4 are respectively written on the buffer memories 55, 56, 57, 58, on a per-horizontal scanline basis.

Namely, the memory control unit 60 generates a clock CK which synchronizes with a horizontal synchronous signal. Based on this clock CK, the memory control unit 60 controls writing of video signals on the frame memories 51, 52, 53, 54 and the buffer memories 55, 56, 57, 58. In this case, the video signals S1, S2, S3, S4 are written on the buffer memories 55, 56, 57, 58, for every other horizontal scanline. Namely, the quantity of vertical data is cut by half.

Later, the memory control unit 60 reads out per-horizontal scanline video signals S11, S21, S31, S41 respectively written on the buffer memories 55, 56, 57, 58, based on the double clock CK and compressing the signals by half. The thus read-out signals are written on the image memory 59. In this situation, the video signals S11, S21, S31, S41 are read out in two steps. First, the video signals S11 written on the buffer memory 55 and the video signals S21 written on the buffer memory 56 are read out alternately. Second, the video signals S31 written on the buffer memory 57 and the video signals S41 written on the buffer memory 58 are read out alternately.

Figure 8:
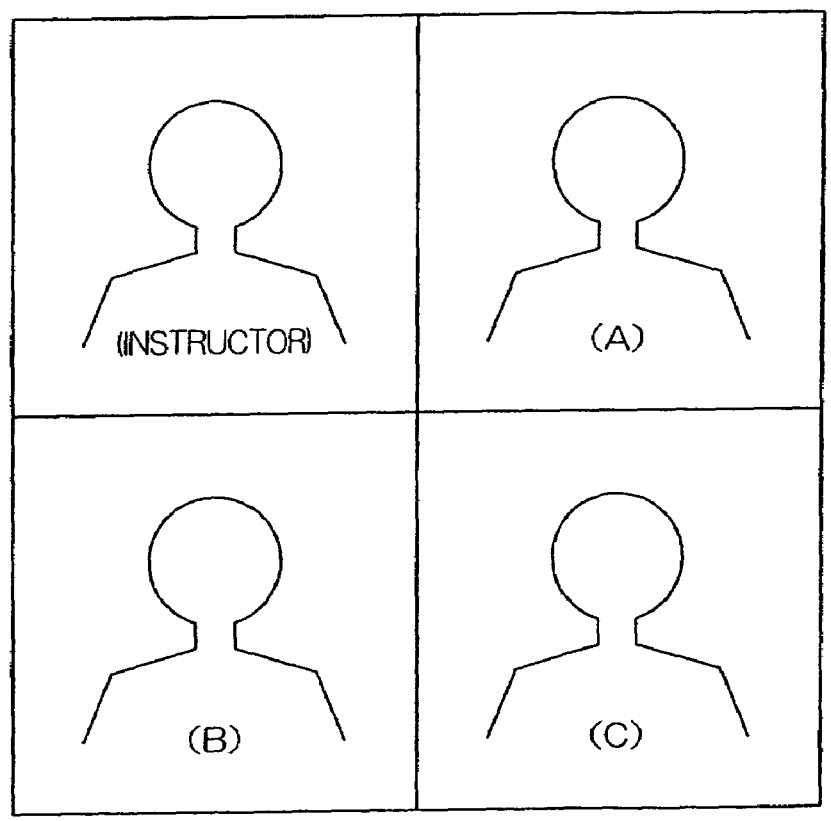
FIG. 8 is a descriptive illustration of a split view example.

Eventually, when one screen worth of image data (synthetic video signals) written on the image memory 59 is read out sequentially and sent to the devices 1, 3, 3, 3, the videos of the instructor and the students appear on each of the devices 1, 3, 3, 3 simultaneously, in a quad view as illustrated in FIG. 8.

Furthermore, in a one-to-three PC lesson wherein one instructor's device 1 and three student's devices 3, 3, 3 are connected to each other, the MCU 26 can permit a video of only one chosen person to appear on the monitors 24, 37 of the instructor's device 1 and the student's devices 3, 3, 3 which are connected to the MCU 26. For example, all of the monitors 24, 37 may present a video of a current speaker. Alternatively, the monitors 37 of the student's devices 3, 3, 3 may show an instructor's video only, whereas the monitor 24 of the instructor's device 1 may show a video of only one of the students chosen by the instructor. Still further, the monitor 24 of the instructor's device 1 may show videos of three students or of two students chosen by the instructor.

The invention claimed is:

1. A personal computer lesson system using videophones, said system comprising an instructor's device for teaching how to operate a personal computer, and a student's device for learning how to operate a personal computer, said instructor's device and said student's device being bidirectionally connected to each other via a communication line, wherein said instructor's device comprises:
a first terminal for controlling said instructor's device;
a first personal computer as a lesson device, said first personal computer being operable to load first image information therefrom;
a first image taking means for taking second image information including at least one of an instructor's image and an image of a keyboard;
a first voice input means for inputting first voice information including an instructor's voice;
a mixer switcher means for mixing or switching between the first image information loaded from said first personal computer and the second image information taken by said first image taking means, either the mixing or the switching being conducted as required;
a first transmitting means for multiplexing image information of said instructor's device and voice information of said instructor's device, and for transmitting first multiplexed information to said student's device, wherein the image information of said instructor's device includes at least one of the first image information and the second image information which is mixed or switched, as required, by said mixer switcher means, and the voice information of said instructor's device is input from said first voice input means;
a first display means for displaying image information of said student's device sent from said student's device; and
a first voice output means for outputting voice information of said student's device sent from said student's device;

wherein said student's device comprises:
a second terminal for controlling said student's device;
a second personal computer as a lesson device said second personal computer being operable to load third image information therefrom;
a second image taking means for taking fourth image information including at least one of a student's image and an image of a keyboard;
a second voice input means for inputting second voice information including a student's voice;
a second transmitting means for multiplexing the image information of said student's device and the voice information of said student's device, and for transmitting second multiplexed information to said instructor's device, wherein the image information of said student's device is either third image information loaded from said second personal computer or the fourth image information taken by said second image taking means, and the voice information of said student's device is input by said second voice input means;
a second display means for displaying the image information of said instructor's device sent from said instructor's device; and
a second voice output means for outputting the voice information of said instructor's device sent from said instructor's devices;

wherein at least one of the image information of said instructor's device and the voice information of said instructor's device is loaded into said first terminal controlling said instructor's device, and said first terminal is operable to transmit, via said first transmission means, the at least one of the image information of said instructor's device and the voice information of said instructor's device loaded therein to said second terminal controlling said student's terminal;

wherein at least one of the image information of said student's device and the voice information of said student's device is loaded into said second terminal controlling said student's device, and said second terminal is operable to transmit, via said second transmission means, the at least one of the image information said student's device and the voice information of said student's device loaded therein to said first terminal controlling said instructor's device;

wherein said system enables the student to learn how to operate his/her own personal computer, by watching an image of the instructor's personal computer or the instructor's keyboard image which is displayed on said second display means of said student's device, and by following the instructor's voice which is output from said second voice output means of said student's device.

2. A personal computer lesson system using videophones, according to claim 1, wherein the first image information loaded from said first personal computer includes not only screen information, but also teaching material data stored in said first personal computer and teaching material data read out from an external storage medium.

3. A personal computer lesson system using videophones, according to claim 2, wherein:

said instructor's device is equipped with an electronic blackboard which allows various notes to be written on the first image information loaded from said first personal computer; and personal computer image information written and processed on said electronic blackboard is output to said mixer switcher means.

4. A personal computer lesson system using videophones, according to claim 3, wherein:

said system further comprises a multipoint control unit operable to bidirectionally connect said instructor's device and said one or more student's devices to each other; and said multipoint control unit is operable to establish a mutual connection between said one or more student's devices and said instructor's device which are connected to said multipoint control unit.

5. A personal computer lesson system using videophones, according to claim 4, wherein:

said multipoint control unit is operable to synthesize, as split views on one screen, image information sent from said instructor's device and said one or more student's devices which are connected to said multipoint control unit; and the synthesized image is displayed on respective screens of said instructor's device and said one or more student's devices, so that the image information from all devices which are connected to said multipoint control unit is displayed simultaneously as split views on one screen.

6. A personal computer lesson system using videophones, according to claim 2, wherein:

said system further comprises a multipoint control unit operable to bidirectionally connect said instructor's device and one or more student's devices to each other; and said multipoint control unit is operable to establish a mutual connection between said one or more student's devices and said instructor's device which are connected to said multipoint control unit.

7. A personal computer lesson system using videophones, according to claim 6, wherein:

said multipoint control unit is operable to synthesize, as split views on one screen, image information sent from said instructor's device and said one or more student's devices which are connected to said multipoint control unit; and the synthesized image is displayed on respective screens of said instructor's device and said one or more student's devices, so that the image information from all devices which are connected to said multipoint control unit is displayed simultaneously as split views on one screen.

8. A personal computer lesson system using videophones, according to claim 1, wherein:

said instructor's device is equipped with an electronic blackboard which allows various notes to be written on the first image information loaded from said first personal computer; and personal computer image information written and processed on said electronic blackboard is output to said mixer switcher means.

9. A personal computer lesson system using videophones, according to claim 8, wherein:

said system further comprises a multipoint control unit operable to bidirectionally connect said instructor's device and one or more student's devices to each other; and said multipoint control unit is operable to establish a mutual connection between said one or more student's devices and said instructor's device which are connected to said multipoint control unit.

10. A personal computer lesson system using videophones, according to claim 9, wherein:

said multipoint control unit is operable to synthesize, as split views on one screen, image information sent from said instructor's device and said one or more student's devices which are connected to said multipoint control unit; and the synthesized image is displayed on respective screens of said instructor's device and said one or more student's devices, so that the image information from all devices which are connected to said multipoint control unit is displayed simultaneously as split views on one screen.

11. A personal computer lesson system using videophones, according to claim 1, wherein:

said system further comprises a multipoint control unit operable to bidirectionally connect said instructor's device and one or more student's devices to each other; and said multipoint control unit is operable to establish a mutual connection between said one or more student's devices and said instructor's device which are connected to said multipoint control unit.

12. A personal computer lesson system using videophones, according to claim 11, wherein:

said multipoint control unit is operable to synthesize, as split views on one screen, image information sent from said instructor's device and said one or more student's devices which are connected to said multipoint control unit; and the synthesized image is displayed on respective screens of said instructor's device and said one or more student's devices, so that the image information from all devices which are connected to said multipoint control unit is displayed simultaneously as split views on one screen.

* * * * *